March 1, 1960 R. L. MEIROWITZ 2,927,223

TEMPERATURE COMPENSATED LIMITER CIRCUITS

Filed Nov. 27, 1957 2 Sheets-Sheet 1

INVENTOR
RICHARD L. MEIROWITZ
BY
L. V. Craddock
ATTORNEY

March 1, 1960 R. L. MEIROWITZ 2,927,223

TEMPERATURE COMPENSATED LIMITER CIRCUITS

Filed Nov. 27, 1957 2 Sheets-Sheet 2

INVENTOR
RICHARD L. MEIROWITZ
BY
ATTORNEY 2,927,223

TEMPERATURE COMPENSATED LIMITER CIRCUITS

Richard L. Meirowitz, Hicksville, N.Y., assignor to Sperry Rand Corporation, Great Neck, N.Y., a corporation of Delaware Application November 27, 1957, Serial No. 699,318

6 Claims. (Cl. 307—88.5)

This invention relates to voltage limiting circuits and more particularly to temperature compensating means for such circuits employing unidirectional conduction devices.

Diode limiting, or clipping, circuits have long been used to limit the peak-to-peak voltage of a waveform to a given magnitude. In these circuits the diodes are in parallel with the input circuit and operate to conduct when the peak input voltage exceeds a given biasing voltage level on the diodes and thus prevents the peak value of the output voltage waveform from exceeding the given voltage level, regardless of any further increase in peak magnitude of the input voltage.

Many unidirectional conduction devices such as diodes are characterized by having a voltage-current relationship which varies as a function of operating temperature. As a result of this characteristic the voltage at which a diode begins to conduct in the forward direction will change with temperature, and if such a diode is employed in a voltage limiting circuit, the peak output voltage of the circuit will vary as a function of the operating temperature of the diode. In many applications a change in the magnitude of the limited output voltage cannot be tolerated and means must be provided to eliminate this temperature effect from the operation of the circuit.

It is also a characteristic of some unidirectional conduction devices that they will not pass appreciable current in the forward direction until the voltage impressed across the terminals of the device exceeds a certain value which depends upon temperature. This causes a limiting circuit to limit the peak output voltage to a value greater than that determined by the applied bias. Under such circumstances the circuit cannot limit to a zero voltage level if so required.

It is therefore an object of this invention to provide in a voltage limiting circuit means for eliminating the variations in the maximum output voltage which are caused by changes with temperature in the conduction characteristics of unidirectional conduction devices employed in the circuit.

It is another object of this invention to provide a voltage limiting circuit whose operation is substantially independent of temperature.

It is a further object of this invention to provide a diode limiting circuit in which the peak output voltage will be directly proportional to the applied bias voltage over a predetermined temperature range.

These and other objects of the invention which will become more apparent as the description proceeds may be attained in a diode limiting circuit in which first and second diodes are connected with unlike terminals, or poles, coupled to the input terminal of the circuit, and first and second substantially equal resistors are connected in shunt with the first and second diodes, respectively. A voltage biasing means is connected to the circuit at a point between the first diode and the first resistor and provides a biasing voltage for the clipping diodes. The compensating means, which in the preferred embodiment of this invention, comprises a pair of diodes whose characteristics are substantially the same as the characteristics of the first and second diodes, are connected in the circuit at a point between the second diode and second resistor and ground.

An example of a unidirectional conduction device having the characteristics referred to above is a silicon junction diode, and by way of example, the present invention will be discussed in connection with a double diode limiting circuit employing such diodes.

For a detailed description of the present invention reference is made to the accompanying drawings wherein.

Figure 1:
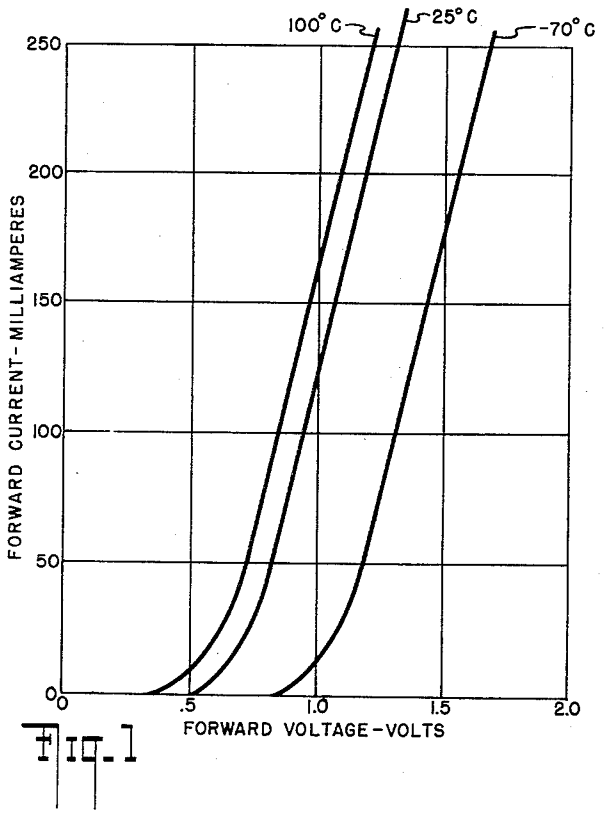
Fig. 1 is a graph illustrating the forward voltage-current characteristics of a typical silicon junction diode at several operating temperatures.

Referring now to Fig. 1, there is shown the forward conduction characteristics of a typical silicon junction diode. It is seen that there is practically no forward current flow through the diode until the forward voltage attains a value approximately equal to .3 volt at an operating temperature of 100° C. It will also be noted that the operating temperature of the diode affects the point at which forward conduction becomes appreciable. As the temperature increases, forward conduction commences at lower voltages. The region on the voltage axis of the curves between zero volts and the voltage at which appreciable current begins to flow through the diode shall be referred to hereinafter as the dead-zone, and the value of voltage represented by that region shall be referred to by the terms dead-zone voltage, or the initial conduction voltage. The slopes of the curves will vary for different types of silicon junction diodes, but the intercept of the curves with the voltage axis will generally be substantially as illustrated.

Figure 2:
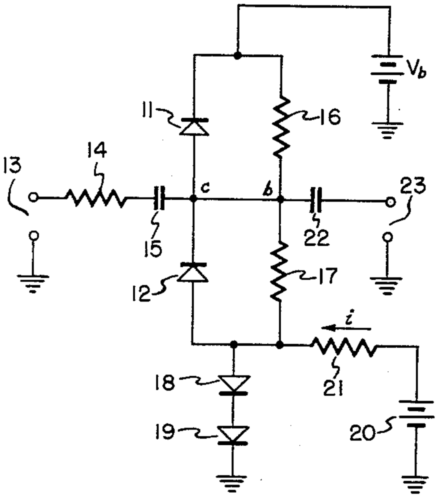
Fig. 2 is a schematic diagram of a double diode limiting circuit employing the compensating means of this invention.

A circuit diagram of a double diode limiting, or clipping, circuit incorporating the compensating means of this invention is illustrated in Fig. 2, wherein first and second silicon junction diodes 11 and 12 are coupled in opposite conduction relationship to signal input terminal 13 through resistor 14 and condenser 15. A first resistor 16 is connected in shunt with first diode 11, and a second resistor 17 is similarly connected to second diode 12. A unidirectional voltage source $V_b$ is connected to the circuit at a point between diode 11 and resistor 16 and provides the biasing voltage source. Compensating means, comprised of silicon junction diodes 18 and 19, are connected in the circuit between ground and a point between diode 12 and resistor 17, and are poled for unidirectional conduction therethrough to ground. Compensating diodes 18 and 19 are of the same type as clipping diodes 11 and 12 and possess substantially the same forward conduction and temperature characteristics as said clipping diodes.

Voltage source 20 and current limiting resistor 21 provide a substantially constant current which establishes a predetermined voltage drop across diodes 18 and 19, as will be explained more fully hereinafter.

Output terminal 23 is coupled through condenser 22 to the limiting circuit at the junction of diodes 11 and 12, and resistors 16 and 17.

Figure 3:
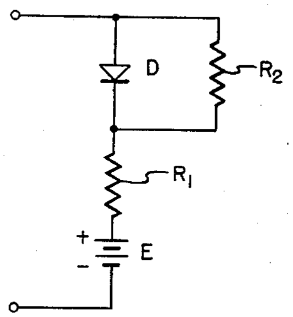
Fig. 3 is a simplified approximate equivalent representation of a silicon junction diode and is used to explain the operation of the circuit of this invention.

Before discussing the operation of the circuit of Fig. 2, it will be helpful to first consider an approximate equivalent representation of a silicon crystal diode as illustrated in Fig. 3. The diode may be represented as a perfect diode D which will conduct in the forward direction the instant that the potential on the positive pole exceeds the potential on the negative pole. It is also assumed that the characteristics of the perfect diode no not change with temperature. The battery in series with the perfect diode is poled to oppose forward conduction through the diode and represents the dead-zone voltage E of the diode which changes with temperature. The resistor $R_1$ in the circuit is equivalent to the internal resistance of the diode. However, for simplicity, this resistor shall be neglected in the discussion which follows since the internal resistance of a conducting diode is very small compared to the voltage drop across resistor 14 in the circuit of Fig. 2 and thus will be omitted. Resistor $R_2$ is the leakage resistance of the diode. This resistance is very high in most practical silicon diodes and hence will also be neglected.

The operation of the diode clipping circuit incorporating the compensating means of this invention will be discussed in connection with Fig. 4, which is similar to the circuit of Fig. 2, except that the diodes have been replaced by their approximate equivalent of a perfect diode and a battery having a voltage E which is equal to the dead-zone voltage, or initial conduction voltage, of the actual diode.

Compensating diodes 18 and 19 are of the same type as limiting diodes 11 and 12, and all diodes possess substantially similar conduction characteristics which vary in like manner over a given operating temperature range. The compensating diodes should be physically located in the circuit so that they will be in substantially the same temperature environment as the limiting diodes 11 and 12.

Biasing voltage source $V_b$ is chosen so that the voltage drop across resistors 16 and 17 establishes the desired biasing voltages on the poles of limiting diodes 11 and 12. The maximum peak-to-peak output voltage will hence be equal to $V_b$. Voltage source 20 and current limiting resistor 21 are so chosen that the total current passing through compensating diodes 18 and 19 is sufficient to cause the voltage across each diode to be approximately equal to the initial conduction voltage, or dead-zone voltage, of the limiting diodes 11 and 12.

Because diodes 18 and 19 have conduction characteristics which are similar to the characteristics of diodes 11 and 12, and since the conduction characteristics of all the diodes vary in a similar manner with temperature changes, the voltages across each diode 18 and 19 will be approximately equal to the initial conduction voltage of limiting diodes 11 and 12 at all operating temperatures. Therefore, the voltage at point *a* in the circuit will be equal to 2E volts. The voltage drops across resistors 16 and 17 will each be $$\frac{V_b-2E}{2}$$

and the voltage at points *b* and *c* with respect to ground will be $$\frac{V_b}{2}+E$$

It is thus seen that by adding compensating diodes 18 and 19 in the circuit the point *c*, which is common to the connected unlike poles of diodes 11 and 12, has been raised in voltage by an amount E over the voltage which would be present at that point if the point *a* were connected directly to ground, as in the conventional practice.

Assuming that the input signal at terminal 13 is in the form of a sine wave, as shown, this signal will be coupled through resistor 14 and condenser 15 to point *c* in the limiting circuit. During the positive portion of the input waveform diode 12 will not conduct because the potentials on its terminals are of opposite polarity to those necessary for forward conduction. Diode 11 will not conduct until the voltage at point *c* in the circuit exceeds the biasing voltage $V_b$ plus the dead-zone voltage E of diode 11 which adds in series with the biasing voltage. However, because point *c* has been raised in voltage by an amount E as a result of the addition of compensating diodes 18 and 19 in the circuit, there is a component of voltage E present at both poles of diode 11, and one will cancel the effect of the other. Therefore, the effect of the dead-zone voltage of diode 11 has been eliminated from the circuit and that diode will conduct as soon as the voltage at point *c* exceeds the biasing voltage $V_b$. After limiting diode 11 begins to conduct, point *c* is effectively held at the potential of the biasing voltage $V_b$ and the output waveform on terminal 23 cannot exceed this voltage, and thus the waveform is limited in the conventional manner. Because the component voltages E on the two poles of diode 11 are both a function of the characteristics of the diodes and since both voltages will vary in the same manner with temperature, the effect of the dead-zone voltage of the clipping diode 11 will be eliminated from the operation of the circuit for any operating temperature.

At the conclusion of the positive portion of the input signal when the voltage of the input waveform passes through zero the D.C. voltage on the upper terminal of diode 12 will be $$\frac{V_b}{2}+2E$$

which represents the D.C. voltage of point *c*, $$\frac{V_b}{2}+E$$

plus the battery voltage E which represents the dead-zone voltage of diode 12. The voltage on the opposite terminal of diode 12 will be the voltage of point *a*, or 2E. It may thus be seen that a component of voltage 2E is present in the bias on each pole of the diode, and these voltages are of a polarity such that one will cancel the effect of the other. Thus, when the voltage of the input signal goes negative by an amount exceeding $$\frac{V_b}{2}$$

the diode will conduct and will limit the negative portion of the output voltage waveform in the usual manner.

It is therefore evident that the effect of the dead-zone voltage of the clipping diodes 11 and 12 has been eliminated from the circuit by the compensating diodes 18 and 19, and because the characteristics of both pairs of diodes will vary in the same manner with temperature, the compensation will be effective for any operating temperature.

Figure 5:
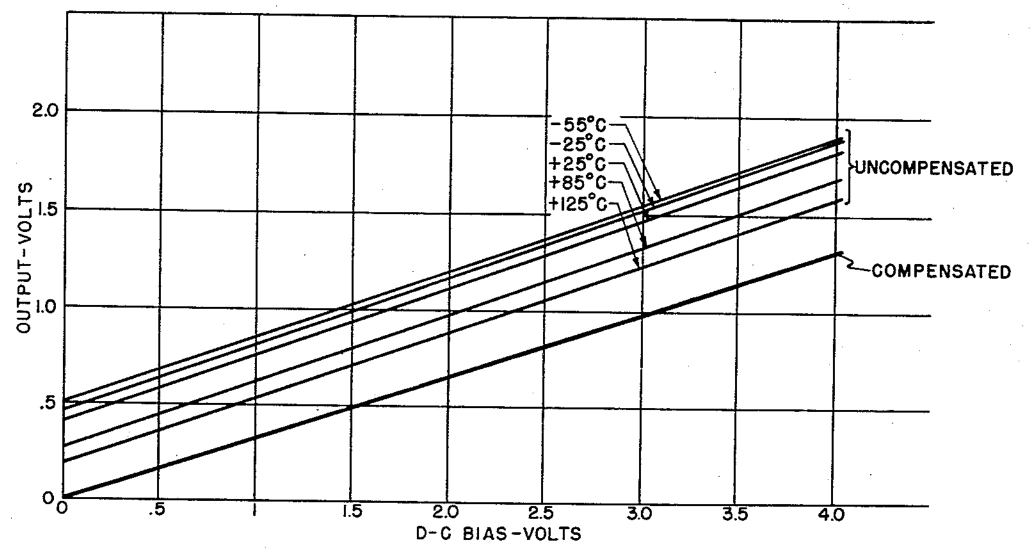
Fig. 5 is a graph showing the output voltage of a double diode limiting circuit with and without the compensating means of this invention when operated at several different temperatures.

Fig. 5 is a graph showing the plot of the output voltage vs. bias voltage of a diode limiting circuit constructed in accordance with this invention. It is evident that the level of the limited output voltage varied as a function of temperature for the uncompensated circuit, but the output voltage curve of the compensated circuit is the same at all temperatures.

Figure 4:
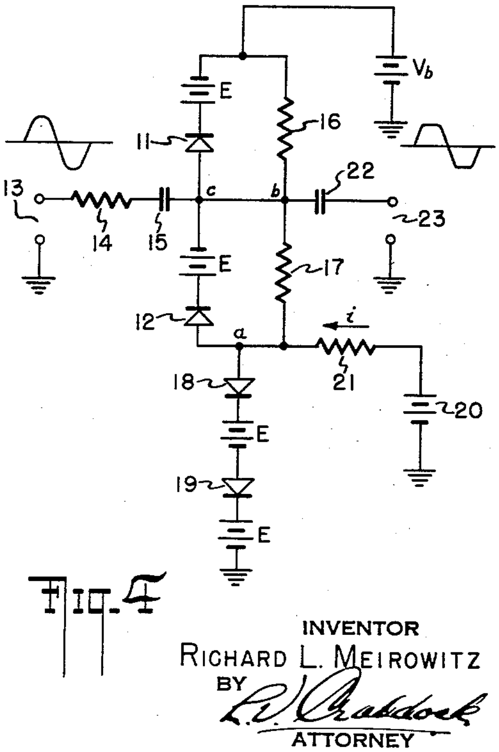
Fig. 4 is a schematic diagram of a double diode limiting circuit in which the diodes have been replaced by the equivalent representation of Fig. 3.

The limiting circuit of Figs. 2 and 4 may be operated without voltage source 20 and current limiting resistor 21 provided that biasing voltage source $V_b$ and resistors 16 and 17 are of a value which will pass a sufficient steady current through diodes 18 and 19 to cause the combined voltage across them to have a value of 2E volts. This embodiment of the circuit is illustrated in Fig. 6, and its operation will be substantially the same as the operation of the circuit of Figs. 2 and 4.

Figure 6:
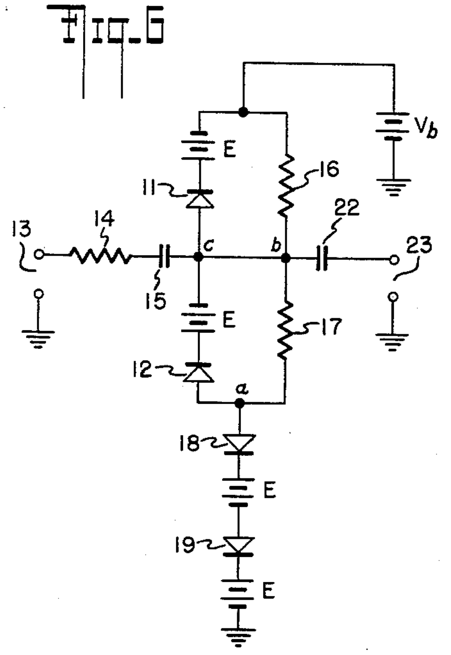
Fig. 6 is an illustration of an alternative embodiment of this invention.

In the operation of the circuits of Figs. 2, 4, and 6, steps must be taken to assure that a relatively steady current flow is maintained through compensating diodes 18 and 19. If diode 12 is allowed to draw an excessive amount of current when it conducts, the current flow through the compensating diodes 18 and 19 will be reduced and they will not be able to provide the necessary voltage drops to compensate for the dead-zone voltages of the limiting diodes, as explained above. To prevent this from occurring, resistor 14 should be of a sufficiently high value to prevent excessive current from flowing through diode 12.

Representative values of circuit elements employed in the embodiment of the invention illustrated in Fig. 2 are listed below:

$V_b$=0–20 volts
$V_{20}$=5–10 volts
$R_{14}$=20,000–100,000 ohms
$R_{16}$, $R_{17}\approx$1 megohm
$R_{21}$=3,000–50,000 ohms (depending on type of diode and $V_{20}$)
$C_{15}$, $C_{22}$=.01 $\mu$f.–1$\mu$f. (depending on frequency)

In one embodiment of a limiting circuit incorporating the instant invention the specific values of the circuit elements were as follows:

$V_b$=20 volts
$V_{20}$=10.5 volts
$R_{14}$=20,000 ohms
$R_{16}$, $R_{17}$=1 megohm
$R_{21}$=5,000 ohms
$C_{15}$, $C_{22}$=.22 $\mu$f.

The diodes employed in the circuit were type SD–10 silicon junction diode manufactured by Sperry Gyroscope Company, Division of Sperry Rand Corporation, which had dead-zone voltages ranging from approximately .2 volt to .8 volt over a temperature range of 100° C. to −70° C., respectively.

Figure 7:
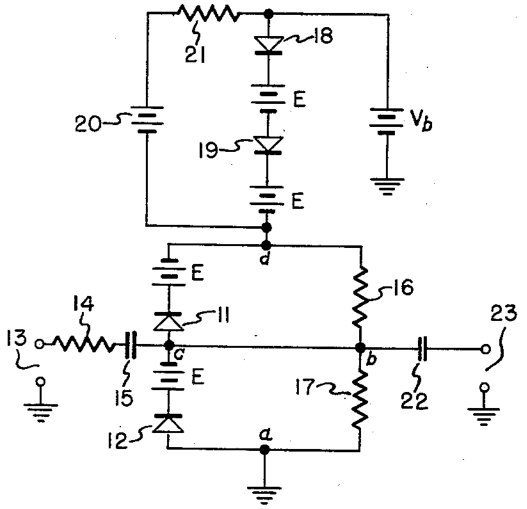
Fig. 7 is a schematic diagram of an alternative embodiment of the circuit of Figs. 2 and 4.

An alternative embodiment of the temperature compensating means of this invention is illustrated in Fig. 7, 1yrspept$_1$ffitd ngnd 0
wherein the compensating diodes 18 and 19 are inserted in the limiting circuit between biasing voltage source $V_b$ and the junction of diode 11 and resistor 16.

Voltage source 20 and current limiting resistor 21 comprise the means for passing a substantially constant current through compensating diodes 18 and 19, so that the voltage drop thereacross is substantially equal to 2E.

Considering the effect of the dead-zone voltages E in the circuit, the potential on the pole of diode 11 which is connected to point *d* is equal to the bias voltage $V_b$ minus the voltage across diodes 18 and 19, plus the dead-zone voltage, or $(V_b-2E)+E$. The potential on the opposite pole of diode 11 is $$\frac{V_b}{2}-E$$

It is thus evident that the effect of the dead-zone voltage of diode 11 is again eliminated since there is a component of voltage −E on each pole of diode 11. The potential on the pole of diode 12 which is connected to point *c* is $$\frac{V_b}{2}-E$$

plus E, the dead-zone voltage, or $$\frac{V_b}{2}-E+E$$

Since the other pole of diode 12 is at ground potential, it is evident that the effect of the dead-zone voltage of diode 12 is eliminated from the circuit.

The operation of the limiting circuit of Fig. 7 will otherwise be similar to that of Fig. 4.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. In a voltage limiting circuit the combination comprising a signal input terminal, first and second unidirectional conduction devices having unlike poles coupled to said input terminal and providing parallel conducting paths from said input terminal, said devices having substantially equal initial conduction voltages which vary in a predetermined manner over a given operating temperature range, a pair of voltage dropping means, the first of said means being connected in shunt with said first conduction device and the second of said means being connected in shunt with said second conduction device, a biasing voltage source connected to the other pole of said first conduction device and providing a biasing voltage for establishing the limitng voltage levels in said circuit, and third and fourth unidirectional conduction devices having conduction characteristics substantially similar to the conduction characteristics of said first and second devices connected in series relation with said biasing voltage source and said pair of voltage dropping means, said third and fourth conduction devices providing a combined voltage drop thereacross which is substantially equal to twice the initial conduction voltage of one of said first or second devices, said voltage drop being of a polarity to oppose said biasing voltage.

2. The voltage limiting circuit of claim 1 including a substantially constant current source for passing a current through said third and fourth conduction devices and thereby establishing said voltage drop across said devices.

3. The voltage limiting circuit of claim 1 wherein said third and fourth unidirectional conduction devices are series connected between said biasing voltage source and said pair of voltage dropping means.

4. In a voltage limiting circuit the combination comprising an input signal terminal, first and second limiting diodes having unlike poles coupled in opposite conduction relationship to said input terminal, said diodes having substantially similar initial conduction characteristics which vary in a predetermined manner over a given temperature range, first and second substantially equal resistors connected in shunt with the first and second diodes, respectively, a unidirectional voltage source connected in series relation with said resistors for providing biasing voltages across said resistors which tend to oppose the forward conduction of said limiting diodes, and third and fourth diodes having conduction characteristics substantially similar to the conduction characteristics of said first and second diodes series connected with said resistors and poled for unidirectional conduction therethrough, an output terminal coupled to said unlike poles of said limiting diodes, and means for passing a current through said third and fourth diodes and thereby providing a voltage drop thereacross which is substantially equal to twice the initial conduction voltage of said limiting diodes.

5. A voltage limiting circuit comprising an input signal terminal, first and second limiting diodes having unlike poles coupled to said input terminal and providing parallel conducting paths from said terminal, said diodes having substantially equal dead-zone voltages which vary in a predetermined manner over a given operating temperature range, means for establishing a unidirectional voltage potential across the poles of said first diode and means for establishing a unidirectional voltage potential across the poles of said second diode, the voltage potentials established across the poles of said diodes having respective polarities which tend to oppose forward current conduction through the respective diodes, compensating means comprising third and fourth diodes substantially similar to said limiting diodes serially connected between said last-named means and ground, said third diode having a pole coupled to an unlike pole of said fourth diode for providing unidirectional current conduction through said third and fourth diodes to ground, and a substantially constant current source for passing a current through said compensating diodes and producing a voltage drop thereacross which is substantially equal to twice the dead-zone voltage of one of said limiting diodes, whereby the unidirectional voltage potential of the unlike terminals of said limiting diodes is raised by an amount substantially equal to the dead-zone voltage of said diodes.

6. In a voltage limiting circuit, the combination comprising a signal input terminal, first and second diodes having unlike poles connected in reverse conduction relationship to said input terminal, resistive means and capacitive means coupling said input terminal to unlike poles of said diodes, said diodes having substantially equal initial conduction voltages which vary in like manner over a given range of operating temperatures, means for establishing a unidirectional voltage potential across the poles of said first diode and means for establishing a unidirectional voltage potential across the poles of said second diode, the voltage potentials established across the poles of said diodes having respective polarities which tend to oppose forward current conduction through the respective diodes, an output signal terminal coupled to said unlike terminals of the first and second diodes, third and fourth diodes having conduction characteristics substantially similar to those of said first and second diodes connected in a series circuit with said voltage potential means, said third and fourth diodes being poled for forward conduction of current through said series circuit, and additional means for passing a current through said third and fourth diodes and causing a combined voltage drop thereacross which is substantially equal to twice the initial conduction voltage of said first and second diodes.

References Cited in the file of this patent

UNITED STATES PATENTS 2,342,238 Barney ---------------- Feb. 22, 1944
2,775,714 Curtis ----------------- Dec. 25, 1956